US012625830B2

(12) United States Patent
Hirata

(10) Patent No.: US 12,625,830 B2
(45) Date of Patent: May 12, 2026

(54) SEMICONDUCTOR DEVICE

(71) Applicant: Renesas Electronics Corporation,
Tokyo (JP)

(72) Inventor: Susumu Hirata, Tokyo (JP)

(73) Assignee: Renesas Electronics Corporation,
Tokyo (JP)

( * ) Notice: Subject to any disclaimer, the term of this
patent is extended or adjusted under 35
U.S.C. 154(b) by 23 days.

(21) Appl. No.: 18/929,778

(22) Filed: Oct. 29, 2024

(65) Prior Publication Data

US 2025/0199972 A1 Jun. 19, 2025

(30) Foreign Application Priority Data

Dec. 15, 2023 (JP) ................................. 2023-212030

(51) Int. Cl.
*G06F 13/26* (2006.01)
(52) U.S. Cl.
CPC .................................... *G06F 13/26* (2013.01)
(58) Field of Classification Search
None
See application file for complete search history.

(56) References Cited

U.S. PATENT DOCUMENTS

| | | | |
|---|---|---|---|
| 8,239,600 B2 | 8/2012 | Yamamoto et al. | |
| 9,792,232 B2 * | 10/2017 | Arndt ...................... | G06F 9/542 |
| 2004/0015628 A1 * | 1/2004 | Glasco .................... | G06F 13/24 |
| | | | 710/260 |
| 2006/0230208 A1 * | 10/2006 | Gregg ..................... | G06F 13/24 |
| | | | 710/260 |
| 2007/0143516 A1 * | 6/2007 | Sato ........................ | G06F 13/26 |
| | | | 710/264 |

FOREIGN PATENT DOCUMENTS

JP 2010-86456 A 4/2010

* cited by examiner

*Primary Examiner* — Michael Sun
(74) *Attorney, Agent, or Firm* — Rimon P.C.

(57) ABSTRACT

An interrupt reception unit receives an interrupt request. In response to a received interrupt request, an interrupt processing unit performs an interrupt process of a first priority or an interrupt process of a second priority having a lower priority than the first priority. An interrupt suppression control unit controls the number of interrupt processes of the second priority processed by the interrupt processing unit in a cycle time according to a suppression condition. The suppression condition is set on the basis of a cycle in which the interrupt process of the second priority occurs and the total number of the interrupt processes of the second priority occurring within a period corresponding to the cycle.

12 Claims, 7 Drawing Sheets

*FIG. 2*

INTERRUPT SUPPRESSION TABLE

| INTERRUPT SUPPRESSION TARGET | ch06,ch13,ch14,ch15 |
|---|---|
| TOTAL NUMBER OF SUPPRESSION TARGET INTERRUPTS (m) | 4 |
| REQUESTED CYCLE (N) | 2 |
| SUPPRESSION CONDITION (m/N) | 2 |
| SUPPRESSION STATE | RELEASED/ SUPPRESSED |

INTERRUPT SUPPRESSION TABLE

| | | |
|---|---|---|
| PRIORITY = MEDIUM | INTERRUPT SUPPRESSION TARGET | ch06-ch09 |
| | TOTAL NUMBER OF SUPPRESSION TARGET INTERRUPTS (m1) | 4 |
| | REQUESTED CYCLE (N1) | 2 |
| | SUPPRESSION CONDITION (m1/N1) | 2 |
| | SUPPRESSION STATE | RELEASED/ SUPPRESSED |
| PRIORITY = LOW | INTERRUPT SUPPRESSION TARGET | ch10-ch15 |
| | TOTAL NUMBER OF SUPPRESSION TARGET INTERRUPTS (m2) | 6 |
| | REQUESTED CYCLE (N2) | 3 |
| | SUPPRESSION CONDITION (m2/N2) | 2 |
| | SUPPRESSION STATE | RELEASED/ SUPPRESSED |

SEMICONDUCTOR DEVICE

CROSS-REFERENCE TO RELATED APPLICATIONS

The disclosure of Japanese Patent Application No. 2023-212030 filed on Dec. 15, 2023 including the specification, drawings and abstract is incorporated herein by reference in its entirety.

BACKGROUND

This disclosure relates to a semiconductor device, and for example, relates to a semiconductor device having a processor that performs an interrupt process.

There are disclosed techniques listed below.

[Patent Document 1] Japanese Unexamined Patent Application Publication No. 2010-086456

As a related art, Patent Document 1 discloses a data processing system excellent in immediacy of the interrupt process. The data processing system described in Patent Document 1 includes a plurality of central processing units, a plurality of interrupt controllers separately allocated to the central processing units, and a circuit module that can be commonly used by the plurality of central processing units. The plurality of interrupt controllers are supplied with separate interrupt request signals from the circuit module. The plurality of interrupt controllers each notify the corresponding central processing unit of the interrupt in response to the input interrupt request signal.

SUMMARY

In recent years, since an in-vehicle micro controller unit (MCU) or system on a chip (SoC) exchanges information with a large number of electronic control units (ECUs), the number of asynchronous communications has been increasing. In the in-vehicle MCU, the amount of the interrupt process of the asynchronous communication system is increasing by the number of increase in the asynchronous communication. A processor such as a central processing unit (CPU) mounted on the in-vehicle MCU performs application processes and processes of asynchronous communication information. In the CPU, as the amount of the asynchronous interrupt processes increases, the time allocated to the application process becomes short. In view of such a problem, there is a demand for a mechanism that can secure the time allocated to the application process even in a case where the asynchronous communication increases.

Other problems and novel features will become apparent from the description of the present specification and the accompanying drawings.

According to an embodiment, a semiconductor device is provided. In the semiconductor device, in response to an interrupt request, an interrupt processing unit performs an interrupt process of a first priority or an interrupt process of a second priority having a lower priority than the first priority. An interrupt suppression control unit controls the number of interrupt processes of the second priority processed by the interrupt processing unit in a cycle time according to a suppression condition. The suppression condition is set on the basis of a cycle in which the interrupt process of the second priority occurs and the total number of the interrupt processes of the second priority occurring within a period corresponding to the cycle.

According to the embodiment, the time that can be allocated to a main process can be increased.

BRIEF DESCRIPTION OF THE DRAWINGS

FIG. 2 is a diagram illustrating an example of an interrupt suppression table corresponding to a certain CPU core.

FIG. 3 is a block diagram illustrating an example of a logical configuration of a CPU.

FIG. 9 is a diagram illustrating an example of an interrupt suppression table used in a third embodiment.

DETAILED DESCRIPTION

Figure 1:
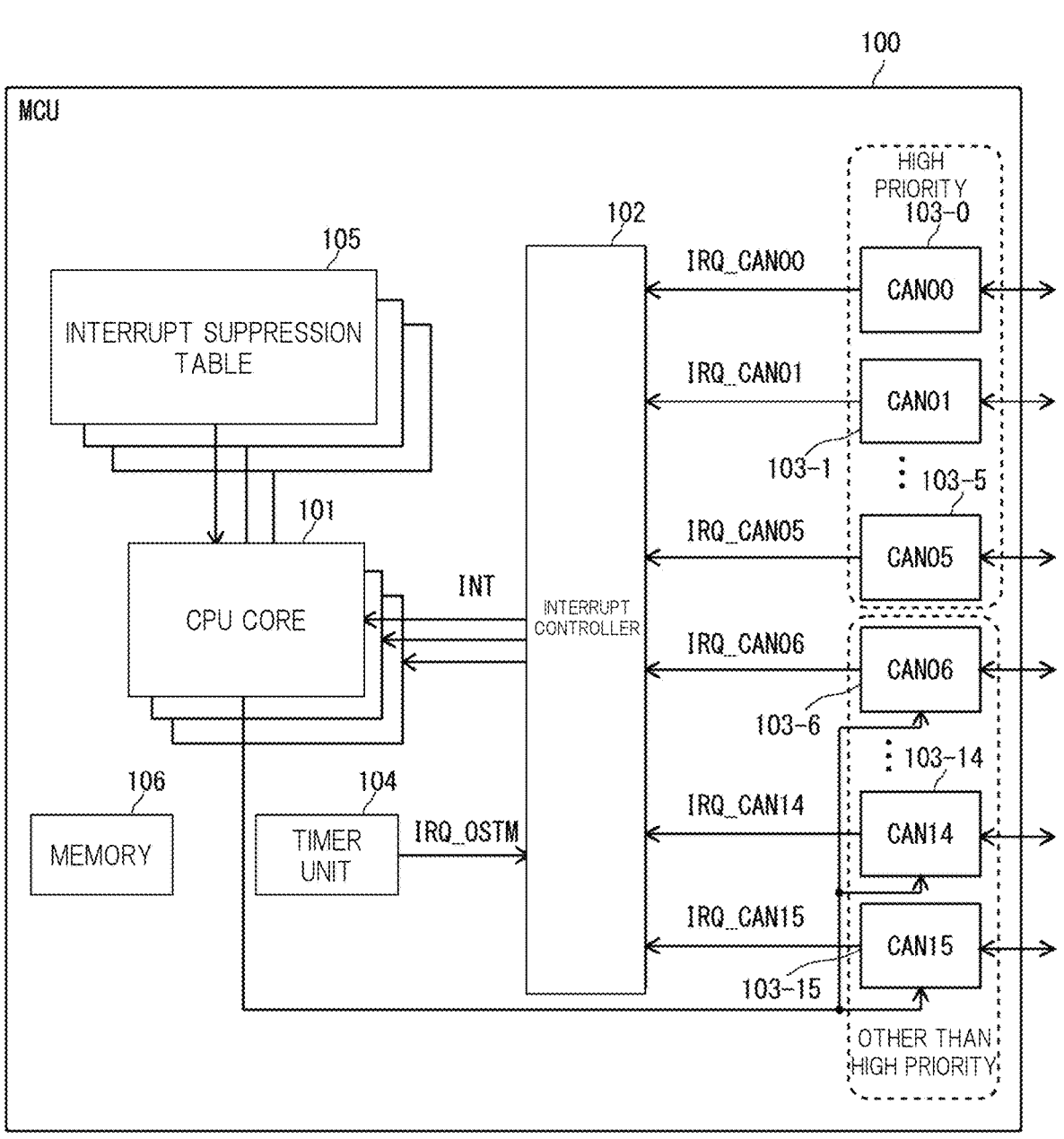
FIG. 1 is a block diagram illustrating a configuration example of a semiconductor device according to a first embodiment of this disclosure.

Prior to the description of embodiments, the background leading to the following embodiments will be described. In an MCU such as an in-vehicle MCU, a CPU performs an interrupt process occurring from a plurality of asynchronous communications while executing a predetermined application process (hereinafter, also referred to as a main process). The main process includes, for example, a high-priority main process and the main process other than the high-priority main process. As the high-priority main process, there is a process of a chassis system that controls turning and stopping of a vehicle. In addition, as the main process of other than high priority, there are a process of a power train system and a process of a body system. The main process is started up every start of a predetermined cycle time.

The main process is designed to cause the process to be completed within a predetermined time. For example, the high-priority main process is designed to cause the process to be completed within a time of 1 ms to 2 ms. The main process of other than the high priority is designed such that the process is completed within a time of, for example, 3 ms to 10 ms. At this time, the CPU needs to perform the interrupt process occurring from the asynchronous communication in addition to the main process. The cycle time, which is also a start-up interval time of the main process, and a processing time of the main process need to satisfy the following relational expression.

$$\text{Cycle time} > \text{Main processing time} + \text{Total interrupt processing time}$$

In the above expression, the total interrupt processing time is the total time of the processing times of all the interrupts that possibly occur within the cycle time. For example, in a case where there is a possibility y that six interrupts of the asynchronous communication occur in the cycle time, the total interrupt processing time is the sum of the times of the six interrupt processes. In this case, the MCU is designed to cause the main process and the six interrupt processes to end within the cycle time. This means that the time that can be allocated to the main process in the cycle time is a time obtained by subtracting the total time of the processing times of all possible interrupts from the cycle time.

In the above design, the CPU can process all the interrupts within one cycle time. However, in a case where the interrupt does not occur in a certain cycle time, the interrupt process is not performed in the cycle time, and thus, the idle time occurs in the CPU. In addition, in a case where all the interrupts do not occur within one cycle time but the interrupts occur in a distributed manner in a plurality of cycle times, the idle time occurs in the CPU in each cycle time.

In recent years, in the MCU or SoC, the number of channels of asynchronous communication has been increasing in order to handle a large amount of information, and the above-described problem becomes more remarkable as the number of channels of asynchronous communication increases. The present inventor has found that, by determining the main processing time on the basis of the total interrupt processing time in a case where the interrupt occurs under the worst condition, the function realized by the main process becomes limited, and thus, the following embodiments have been conceived.

Hereinafter, embodiments to which means for solving the above problems are applied will be described in detail with reference to the drawings. For clarity of description, the following description and drawings are omitted and simplified as appropriate. In the drawings, the same elements are denoted by the same reference numerals, and redundant description is omitted as necessary.

In the following embodiments, when it is required for convenience, the description will be divided into a plurality of sections or embodiments, but unless otherwise specified, the sections or embodiments are not irrelevant to each other, and one is in a relationship of some or all modifications, application examples, detailed descriptions, supplementary descriptions, or the like of the other. In addition, in the following embodiments, in a case of referring to the number of elements and the like (including the number of pieces, a numerical value, an amount, a range, and the like), the number is not limited to a specific number unless otherwise specified or clearly limited to the specific number in principle, and the number may be equal to or more than the specific number or may be equal to or less than the specific number.

Furthermore, in the following embodiments, the constituents (including operation steps and the like) of the embodiments are not necessarily essential unless otherwise specified or considered to be obviously essential in principle. Similarly, in the following embodiments, in a case of referring to a shape, a positional relationship, or the like of a constituent or the like, the shape or the like substantially approximates or is similar to the shape or the like unless otherwise specified or clearly considered not to be applicable in principle. The same applies to the above numbers (including the number of pieces, the numerical value, the amount, and the range).

First Embodiment

FIG. 1 illustrates a configuration example of a semiconductor device according to a first embodiment of this disclosure. In the present embodiment, the semiconductor device is configured as an MCU or SoC. The MCU 100 illustrated in FIG. 1 includes a plurality of CPU cores 101, an interrupt controller 102, a plurality of communication interfaces 103-0 to 103-15, a timer unit 104, a plurality of interrupt suppression tables 105, and a memory 106. The MCU 100 is used as, for example, an in-vehicle MCU that implements functions such as advanced driver-assistance systems (ADAS) and automated driving. The MCU 100 may be used as, for example, a domain controller or a zone controller in an electrical/electronic (E/E) architecture.

The CPU core 101 executes various processes such as a main process and an interrupt process in the MCU 100. The CPU core 101 is, for example, a CPU core included in a multi-core CPU. The timer unit 104 includes a timer that measures a predetermined cycle time. In the timer unit 104, a timeout occurs every time the predetermined cycle time elapses. When the timer times out, the timer unit 104 notifies the interrupt controller 102 of an interrupt request IRQ_OSTM.

The memory 106 stores a program. The program includes a command group or a software code for causing the CPU core 101 to execute various processes when the program is executed by the CPU core 101. In the present embodiment, the processing performed by the CPU core 101 includes the main process and the interrupt process. The CPU core 101 starts the main process every start of the predetermined cycle time. In addition, every time the interrupt occurs, the CPU core 101 performs the interrupt process corresponding to the interrupt that has occurred.

The program may be stored in a non-transitory computer readable medium or a tangible storage medium. As an example and not by way of limitation, the computer-readable medium or the tangible storage medium includes a random access memory (RAM), a read only memory (ROM), a flash memory, a solid-state drive (SSD) or other memory technology, a compact disc (CD)-ROM, a digital versatile disc (DVD), Blu-ray (registered trademark) disc or other optical disk storage, a magnetic cassette, a magnetic tape, a magnetic disk storage or other magnetic storage devices. The program may be transmitted on a transitory computer readable medium or a communication medium. By way of example, and not limitation, a transitory computer-readable medium or a communication medium includes electrical, optical, acoustic, or other forms of propagated signals.

Each of the communication interfaces 103-0 (CAN00) to 103-15 (CAN15) is a communication interface that communicates with an external device connected to the MCU 100 via a communication bus. Each of the communication interfaces 103-0 to 103-15 notifies the interrupt controller 102 of the interrupt request IRQ_CAN00 to IRQ_CAN15 if a condition that the interrupt occurs is satisfied. The communication interfaces 103-0 to 103-15 perform asynchronous communication with the external device, and a timing at which the communication interfaces 103-0 to 103-15 notify of the interrupt request can be different for each communication interface.

In the present embodiment, the communication interfaces 103-0 to 103-15 are grouped into two groups according to the priority of the interrupt process. In the example in FIG. 1, the communication interfaces 103-0 to 103-5 are communication interfaces corresponding to a high-priority (first priority) interrupt process, that is, an interrupt process having a high priority. On the other hand, the communication interfaces 103-6 to 103-15 are communication interfaces corresponding to an interrupt process having a priority (second priority) other than the high priority. The high-priority interrupt process is, for example, an interrupt process in which data processed by the interrupt is used in the high-priority main process. The interrupt process of other than high priority is, for example, an interrupt process in which data processed by the interrupt is used in the main process of other than the high priority. For convenience, the interrupt process of priority other than high priority is also referred to as a low-priority interrupt process or an interrupt process having a low priority.

Note that the communication interfaces 103-0 to 103-15 are also referred to as the communication interfaces 103 in a case where the communication interfaces 103 do not particularly need to be distinguished from each other. In the present embodiment, the communication interface 103 is assumed to be a controller interface that communicates with a device area network (CAN) connected to the CAN. The communication interface 103 may include an interface of another communication standard such as Ethernet (registered trademark). The number attached to the communication interface 103 corresponds to a channel number. In the MCU 100, the number of channels, that is, the number of communication interfaces 103 is optional, and is not particularly limited to 16.

The interrupt controller 102 controls which interrupt request among the interrupt requests notified from the plurality of communication interfaces 103 is to be notified to the CPU core 101. For example, when the communication interface 103-0 notifies the interrupt controller 102 of the interrupt request IRQ-CAN00, the interrupt controller 102 transmits an interrupt signal INT, which indicates that the interrupt has occurred in the channel 00, to one of the plurality of CPU cores 101. It is assumed that, which CPU core among the plurality of CPU cores 101 performs the interrupt process of which channel is defined in advance. When the interrupt request is notified from a certain communication interface 103, the interrupt controller 102 outputs the interrupt signal to the CPU core 101 that performs the interrupt process of the certain communication interface. When the interrupt request is notified from the timer unit 104, the interrupt controller 102 notifies each of the plurality of CPU cores 101 that the timer interrupt has occurred.

In the present embodiment, the interrupt process performed by the CPU core 101 includes one or more high-priority interrupt processes and one or more low-priority interrupt processes. When the interrupt is notified from the communication interfaces 103-0 to 103-05, the CPU core 101 performs the high-priority interrupt process. The high-priority interrupt process includes, for example, a process of generating data used in the high-priority main process. In the present embodiment, it is assumed that the data generated in the interrupt process is to be used in the high-priority main process in the next cycle time. Therefore, it is assumed that the high-priority interrupt process is requested to end the process within the cycle time in which the interrupt has occurred. When the interrupt is notified from the communication interface 103-6 to 103-15, the CPU core 101 performs the low-priority interrupt process. In the present embodiment, it is assumed that each of one or more low-priority interrupt processes occurs once within the N cycle time, where N is a natural number, for example, an integer of 2 or more. In the present embodiment, it is assumed that the low-priority interrupt process is requested to end the process before the next low-priority interrupt occurs. In other words, it is assumed that the low-priority interrupt process is requested to end the process within the N cycle time from the start of the cycle time in which the interrupt has occurred.

In the present embodiment, the CPU core 101 suppresses, within one cycle time, the interrupt process of a priority other than the high priority under a predetermined condition. Each of the plurality of interrupt suppression tables 105 is a table in which parameters related to interrupt suppression are registered. The interrupt suppression table 105 is generated corresponding to each CPU core 101, for example, for every CPU core 101. The interrupt suppression table 105 includes information defining a communication interface to be an interrupt suppression target. The communication interface as the interrupt suppression target is synonymous with a communication interface corresponding to the interrupt process of a priority other than high priority. In addition, the interrupt suppression table 105 includes a suppression condition. In the present embodiment, the suppression condition (first suppression condition) indicates an upper limit of the number of times of interrupt processes of the interrupt suppression target in the cycle time. The suppression condition is set on the basis of a cycle in which the low-priority interrupt process occurs and the total number of the low-priority interrupt processes occurring within a period corresponding to the cycle. Here, the total number of the low-priority interrupt in processes occurring the period corresponding to the cycle in which the low-priority interrupt process occurs can mean not only the total number of the interrupt processes actually occurring in the period but also the total number of the interrupt processes that possibly occurs in the period in terms of design or operation. Furthermore, the interrupt suppression table 105 includes a suppression state indicating whether the interrupt of the communication interface as the interrupt suppression target is in a suppressed state or in a suppression released state. Note that the data of the interrupt suppression table 105 may be stored in the memory 106 or in a not-illustrated storage area in the MCU 100.

FIG. 2 illustrates an example of the interrupt suppression table 105 corresponding to a certain CPU core 101. In this example, the interrupt suppression table includes the interrupt suppression target, the total number of suppression target interrupts, a requested cycle, and the suppression state. The interrupt suppression target defines that in which communication interface or channel the interrupt is to be suppressed. For example, in a case where ch06 and ch13 to ch15 are registered as the interrupt suppression targets, among the communication interfaces 103-0 to 103-15 of the MCU 100, the communication interfaces 103-6 and 103-13 to 103-15 are defined as the communication interfaces of the suppression target. The total number of suppression target interrupts indicates the total number of low-priority interrupts occurring in the period corresponding to the cycle in which the low-priority interrupt occurs, the low-priority interrupt being performed by the interrupt process performed by the corresponding CPU core 101.

The requested cycle is information indicating that, in how many cycle times the low-priority interrupt process, that is, the suppression target interrupt process is requested to end the process. For example, in a case where the low-priority interrupt occurs at a rate of once in four cycle times, the low-priority interrupt process is requested to end the process within a time corresponding to four cycle times including the cycle time in which the interrupt has occurred. In that case, "4" is registered in the requested cycle of the interrupt suppression table. The requested cycle is related to an occurrence frequency of the low-priority interrupt process, that is, related to the number of cycles that has elapsed before one interrupt occurs. In the present embodiment, it is assumed that all the suppression target interrupt processes occur in the same cycle, and the requested cycles of the suppression target interrupt processes are the same. In other words, in the present embodiment, it is assumed that all the interrupt processes of other than the high priority are requested to end within a period of the same requested cycle. In a case where all the suppression target interrupt processes occur in the same cycle, the total number of suppression target interrupts is equal to the number of the communication interfaces 103 of the interrupt suppression targets. The suppression condition indicates a condition under which the low-priority interrupt process is suppressed. In the present embodiment, the suppression condition indicates an upper limit of the number of times of the low-priority interrupt processes that can be performed within one cycle time. In other words, the suppression condition defines how many times the low-priority interrupt processes occurs to suppress the low-priority interrupt process. The suppression condition is given by, for example, m/N (fraction is rounded up) where m is a natural number representing the total number of suppression target interrupts and N is a natural number indicating the requested cycle.

The suppression state indicates whether the low-priority interrupt process is suppressed or not. The suppression state is initialized to "RELEASED" every time the cycle time starts. When the number of times of the low-priority interrupt processes becomes equal to the number of times indicated by the suppression condition, the suppression state is changed to "SUPPRESSED". In a case where the suppression state is "RELEASED", the interrupt request notified from the communication interface of the interrupt suppression target is input to the CPU core 101, and the low-priority interrupt process is performed in the CPU core 101. When the suppression state is changed to "SUPPRESSED", the output of the request interrupt is suppressed in the communication interface of the interrupt suppression target, and the low-priority interrupt process is not performed in the CPU core 101.

Figure 3:
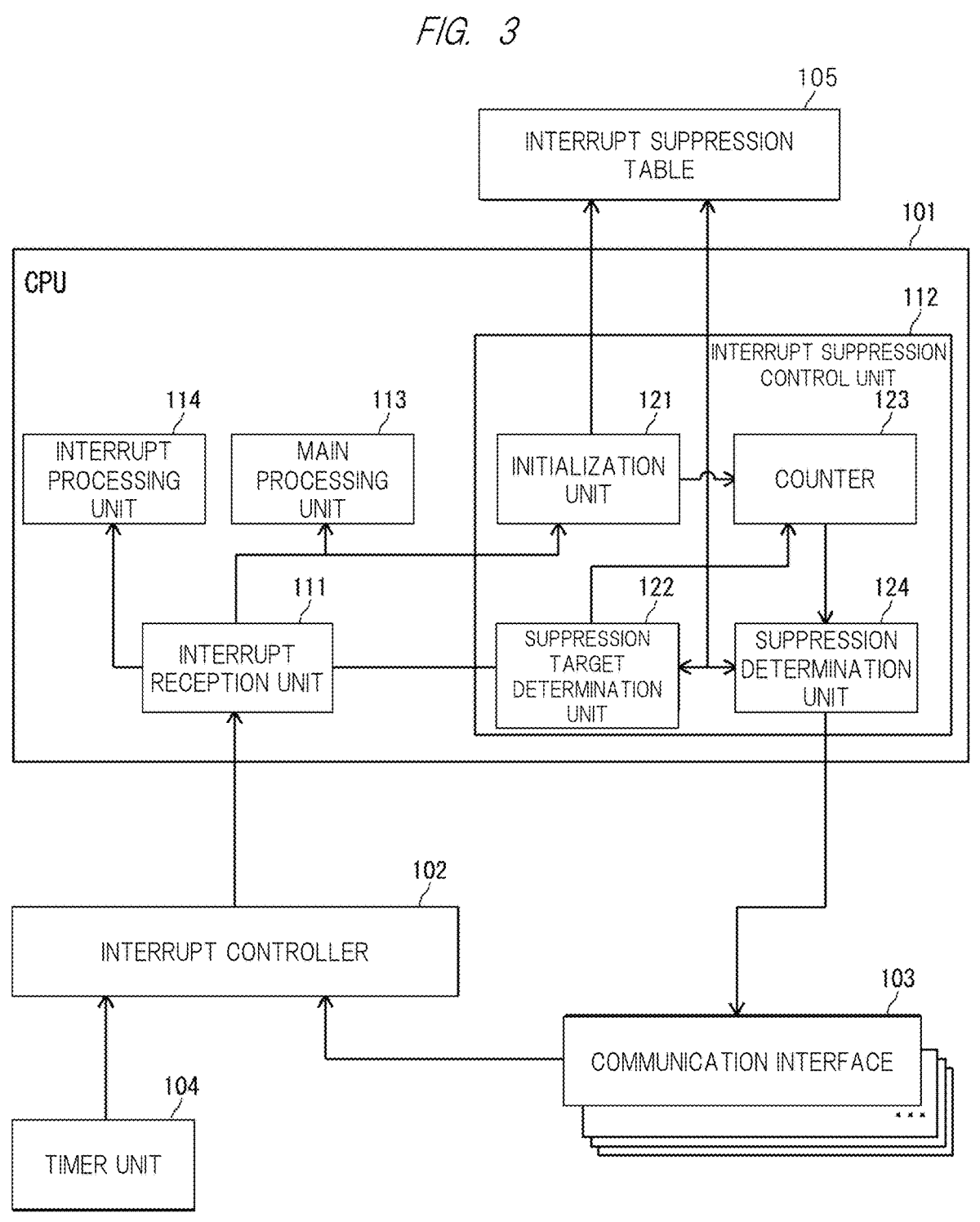

FIG. 3 illustrates an example of a logical configuration of the CPU core 101. The CPU core 101 includes an interrupt reception unit 111, an interrupt suppression control unit 112, a main processing unit 113, and an interrupt processing unit 114. The interrupt suppression control unit 112 includes an initialization unit 121, a suppression target determination unit 122, a counter 123, and a suppression determination unit 124.

The interrupt reception unit 111 receives an interrupt that is input from the interrupt controller 102. In a case where the interrupt received by the interrupt reception unit 111 is an interrupt request output from the timer unit 104, that is, in a case where the interrupt is a timer interrupt, the interrupt reception unit 111 instructs the main processing unit 113 to start the main process. Furthermore, the interrupt reception unit 111 notifies the interrupt suppression control unit 112 that there is a timer interrupt. If there is a timer interrupt, the main processing unit 113 starts the main process. In a case where the interrupt received by the interrupt reception unit 111 is the interrupt request output from any of the communication interfaces 103, the interrupt reception unit 111 instructs the interrupt processing unit 114 to start the interrupt process. In response to the received interrupt, the interrupt processing unit 114 performs the interrupt process.

The interrupt suppression control unit 112 controls suppression of the low-priority interrupt process, and controls the number of the low-priority interrupt processes processed by the interrupt processing unit 114 within one cycle time to be smaller than the total number of the low-priority interrupt processes. When the timer interrupt is notified, the initialization unit 121 of the interrupt suppression control unit 112 initializes the suppression state of the interrupt suppression table 105 to "RELEASED". In addition, a count value of the counter 123 is reset to 0. The suppression target determination unit 122 determines whether or not the interrupt received by the interrupt reception unit 111 is a target of interrupt suppression control. The suppression target determination unit 122 compares the communication interface of the occurrence source of the received interrupt with the communication interface registered as the interrupt suppression target in the interrupt suppression table 105, and determines whether or not the received interrupt is the interrupt output from the communication interface registered as the interrupt suppression target.

For example, it is assumed that the interrupt reception unit 111 receives an interrupt corresponding to an interrupt request output from the communication interface 103-0 (ch0). In that case, since "ch0" does not exist as the interrupt suppression target in the interrupt suppression table 105 illustrated in FIG. 2, the suppression target determination unit 122 determines that the interrupt of ch0 is not a target of the interrupt suppression control. Next, it is assumed that the interrupt reception unit 111 receives an interrupt corresponding to an interrupt request output from the communication interface 103-6 (ch6). In that case, since "ch6" is included as the interrupt suppression target in the interrupt suppression table 105 illustrated in FIG. 2, the suppression target determination unit 122 determines that the interrupt of ch6 is a target of the interrupt suppression control.

If the suppression target determination unit 122 determines that the received interrupt is the target of the interrupt suppression control, the counter 123 increments the count value by 1. In other words, the counter 123 counts the number of times it is determined that the received interrupt is the interrupt output from the communication interface 103 registered as the interrupt suppression target. The suppression determination unit 124 determines whether or not to suppress the low-priority interrupt process on the basis of the count value of the counter 123 and the suppression condition of the interrupt suppression table 105. For example, when the count value reaches the number of times of the suppression condition, that is, if the count value matches the number of times of the suppression condition, the suppression determination unit 124 determines to suppress the low-priority interrupt process.

If it is determined that the low-priority interrupt process is to be suppressed, the suppression determination unit 124 outputs a suppression signal to the communication interface registered as the interrupt suppression target in the interrupt suppression table 105. Upon receiving the suppression signal, the communication interface 103 suppresses the output of the interrupt request. The suppression determination unit 124 stops the output of the suppression signal when the counter 123 and the suppression state of the interrupt suppression table are initialized. When the output of the suppression signal is stopped, the communication interface 103 releases the suppression of the output of the interrupt request.

Figure 4:
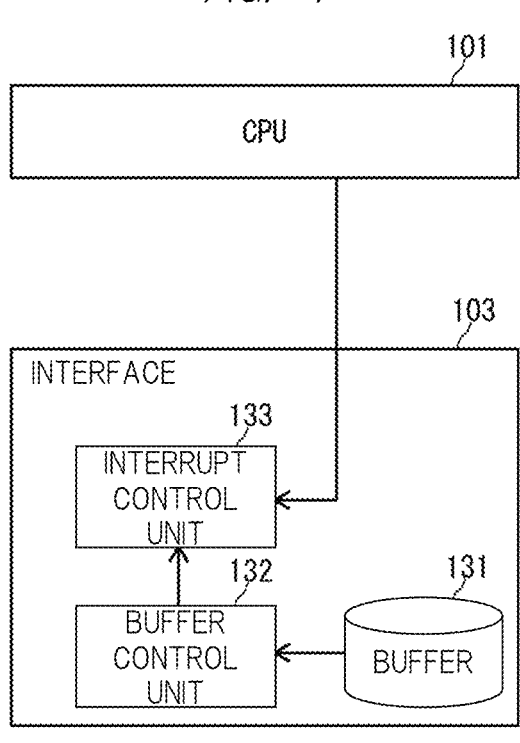
FIG. 4 is a block diagram illustrating a configuration example of a communication interface.

FIG. 4 illustrates a configuration example of the communication interface 103. The communication interface 103 includes a buffer 131, a buffer control unit 132, and an interrupt control unit 133. The buffer 131 stores a message transmitted from an external device connected via a communication bus such as a CAN bus. For example, a first-in first-out (FIFO) buffer is used as the buffer 131. The number of stages of the FIFO buffer is set on the basis of, for example, one cycle time/message length, and a message interval. When a predetermined number of messages are stored in the buffer 131, for example, when the FIFO buffer becomes full, the buffer control unit 132 notifies the interrupt control unit 133 that the predetermined number of messages are stored in the buffer 131.

When the predetermined number of messages are stored in the buffer 131, the interrupt control unit 133 transmits the interrupt request to the CPU core 101 via the interrupt controller 102. At this time, in a case where the suppression signal is output from the suppression determination unit 124 of the CPU core 101, the interrupt control unit 133 suppresses the transmission of the interrupt request. The interrupt control unit 133 suppresses the transmission of the interrupt request until the output of the suppression signal is stopped, and transmits the interrupt request to the CPU core 101 when the output of the suppression signal is stopped. When the interrupt request is received by the CPU core 101, the interrupt processing unit 114 of the CPU core 101 performs the interrupt process. In the interrupt process, the interrupt processing unit 114 acquires the message stored in the buffer 131 and performs the interrupt process by using the acquired message.

Figure 5:
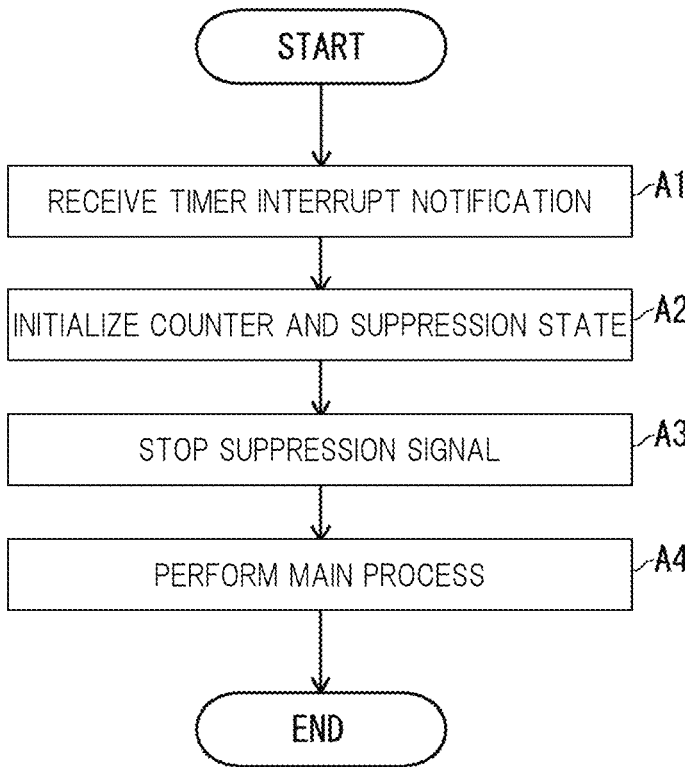
FIG. 5 is a flowchart illustrating an operation procedure of an MCU at the time when a timer interrupt occurs.

Next, an operation procedure will be described. FIG. 5 illustrates the operation procedure of the MCU 100 at the time when the timer interrupt occurs. The timer unit 104 measures a predetermined time by using the timer, and outputs a timer interrupt request to the CPU core 101 via the interrupt controller 102 every predetermined cycle time, for example, 1 ms. The interrupt reception unit 111 of the CPU core 101 receives the timer interrupt request from the timer unit 104 via the interrupt controller 102 (step A1).

Upon receiving the timer interrupt request, the initialization unit 121 initializes the count value of the counter 123 to 0, and initializes the suppression state of the interrupt suppression table to "RELEASED" (step A2). By the counter 123 being initialized, the suppression determination unit 124 determines that the low-priority interrupt process is not suppressed. In a case where the suppression signal has been output to the communication interface 103 in the previous cycle time, the suppression determination unit 124 stops the output of the suppression signal (step A3). The interrupt reception unit 111 instructs the main processing unit 113 to start up the main processing. Upon receiving the start-up instruction, the main processing unit 113 starts the main process (step A4).

Figures 6, 7:
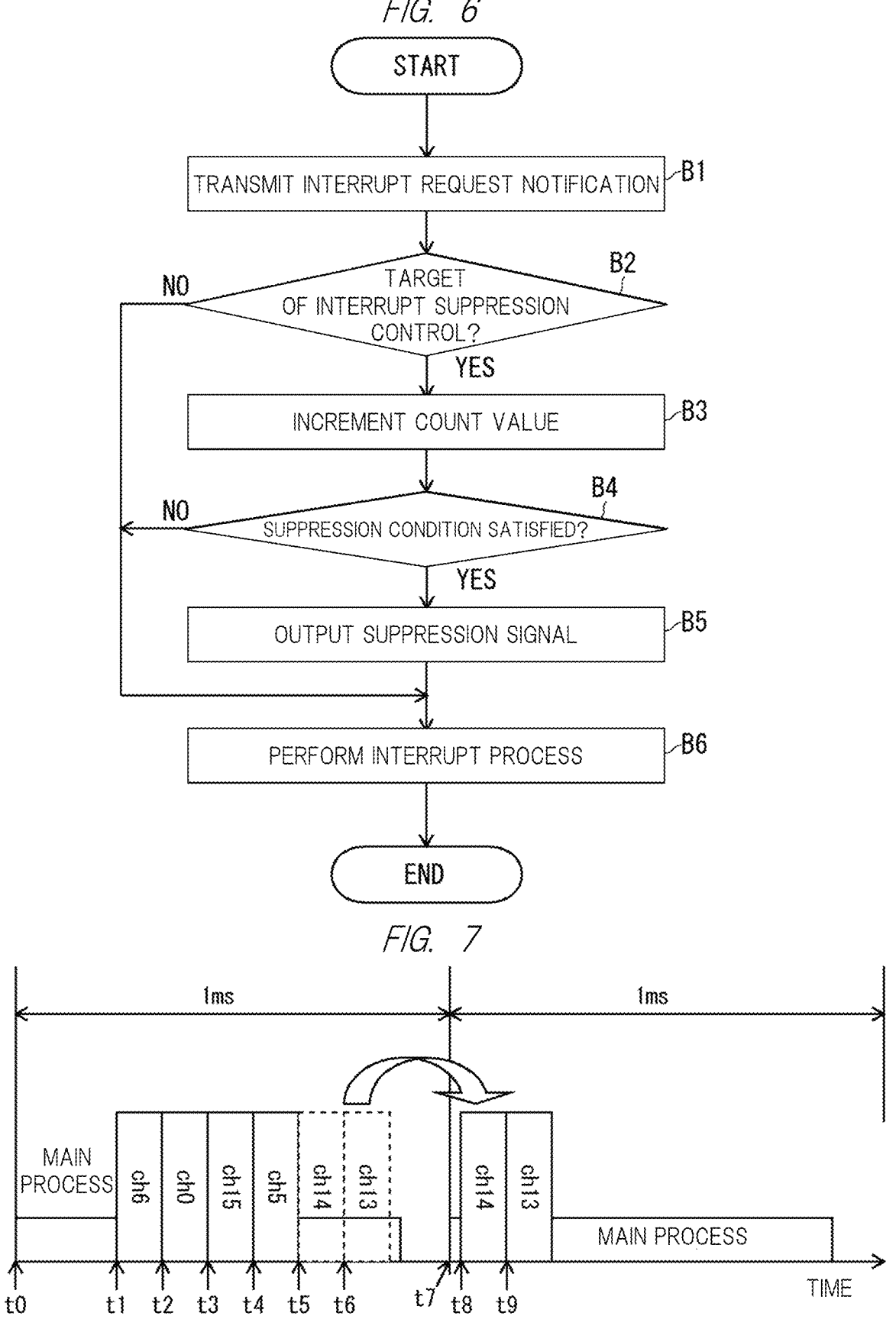
FIG. 6 is a flowchart illustrating an operation procedure of the MCU in a case where an interrupt request is output from the communication interface.
FIG. 7 is a schematic diagram schematically illustrating execution of processes performed by the CPU.

FIG. 6 illustrates an operation procedure of the MCU 100 in a case where the interrupt request is transmitted from the communication interface 103. In the communication interface 103, for example, if (the number of messages stored in) the buffer 131 reaches a predetermined number, the interrupt control unit 133 transmits the interrupt request to the CPU core 101 via the interrupt controller 102 (step B1). Note that this transmission of the interrupt request is asynchronous with the cycle time. In the MCU 100, the interrupt requests can be transmitted from the plurality of communication interfaces 103 within one cycle time.

In the CPU core 101, the interrupt reception unit 111 receives the interrupt request transmitted from the communication interface 103. The suppression target determination unit 122 determines whether or not the communication interface 103 that has output the interrupt request is a target of the interrupt suppression control (step B2). In step B2, the suppression target determination unit 122 checks whether or not the communication interface 103 that has output the interrupt request is registered as an interrupt suppression target in the interrupt suppression table 105. In a case where the communication interface 103 that has output the interrupt request is registered as an interrupt suppression target, the suppression target determination unit 122 determines that the received interrupt is the target of the interrupt suppression control.

If it is determined that the received interrupt is the target of the interrupt suppression control, the counter 123 increments the count value by one (step B3). The suppression determination unit 124 determines whether or not the suppression condition of the interrupt suppression table 105 is satisfied on the basis of the count value of the counter 123 (step B4). In step B4, the suppression determination unit 124 compares the count value with the upper limit of the number of times indicated by the suppression condition, and determines that the suppression condition is satisfied when the count value reaches the upper limit of the number of times indicated by the suppression condition.

If it is determined that the suppression condition is satisfied, the suppression determination unit 124 outputs the suppression signal to the communication interface 103 as the target of the interrupt suppression control (step B5). In step B5, the suppression determination unit 124 refers to, for example, the interrupt suppression table 105 illustrated in FIG. 2, and specifies the communication interfaces of ch06 and ch13 to ch15 as the communication interfaces of the interrupt suppression target. In this case, the suppression determination unit 124 outputs the suppression signal to each of the low-priority communication interfaces 103-6 and 103-13 to 103-15. The communication interfaces 103-6 and 103-13 to 103-15 suppress the transmission of the interrupt request while the suppression signal is output. At this time, the suppression determination unit 124 does not output the suppression signal to the high-priority communication interfaces 103-0 to 103-5. Therefore, the communication interfaces 103-0 to 103-5 can transmit the interrupt request to the CPU core 101.

The interrupt processing unit 114 performs the interrupt process corresponding to the interrupt received in step B1 (step B6). If it is determined in step B2 that the communication interface 103 that has output the interrupt request is not a target of the interrupt suppression control, steps B3 to B5 are skipped, and the interrupt process is performed in step B6. If it is determined in step B4 that the suppression condition is not satisfied, step B5 is skipped, and the interrupt process is performed in step B6.

For example, it is assumed that all m pieces of the interrupt processes of other than high priority, that is, the low-priority interrupt processes occur in a certain cycle time. In this case, in each cycle time, m/N (fraction is rounded up) pieces of low-priority interrupts are received by the CPU core 101, and the low-priority interrupt process is performed. Therefore, the CPU core 101 can complete all m pieces of the low-priority interrupt processes in the Nth cycle time from a certain cycle time. As described above, in the present embodiment, the CPU core 101 can perform m pieces of the interrupt process of other than high priority in a distributed manner during the N cycle times. The time during which the CPU core 101 can perform the main process in each cycle time can be expressed by the following relational expression.

$$\text{Main processsing time} <$$
$$\text{Cycle time} - (\text{Processing time of all high-priority interrupts} +$$
$$\text{Processing time of all interrupts of other than high priority}/N)$$

Next, a specific operation example will be described. FIG. 7 schematically illustrates execution of the process performed by the CPU core 101. Here, it is assumed that one cycle time is 1 ms, and the requested cycle of the interrupt process of a priority of other than the high priority is N=2. In addition, it is assumed that a certain CPU core included in the CPU core 101 performs the interrupt processes of ch0, ch5, ch6, and ch13 to ch15, that is, the communication interfaces 103-0, 103-5, 103-6, and 103-13 to 103-15. It is assumed that ch6 and ch13 to ch15 of the communication interface are registered as the interrupt suppression targets in the interrupt suppression table 105. Among the interrupt processes, the number of interrupt processes of other than high priority is m=4.

At time to, the timer unit 104 causes the timer interrupt to occur. The main processing unit 113 of the CPU core 101 starts the main process when the timer unit 104 causes the timer interrupt to occur. In addition, the initialization unit 121 initializes the count value of the counter 123 to 0, and initializes the suppression state of the interrupt suppression table 105 to "RELEASED".

At time t1, when the number of messages stored in the buffer 131 reaches a predetermined number in the communication interface 103-6, that is, the communication interface of ch6, the interrupt control unit 133 outputs the interrupt request to the interrupt controller 102. The interrupt reception unit 111 of the CPU core 101 receives the interrupt request output from ch6. In the CPU core, the main processing unit 113 interrupts the main process, and the interrupt processing unit 114 performs the interrupt process of ch6.

The suppression target determination unit 122 refers to the interrupt suppression target in the interrupt suppression table 105 and determines whether or not ch6 in which the interrupt has occurred is the suppression target. Since ch6 is registered as the interrupt suppression target, the suppression target determination unit 122 determines that ch6 is the suppression target. In this case, the count value of the counter 123 is incremented by one to be set to "1". The suppression determination unit 124 compares the count value "1" with the suppression condition m/N=2. Since the count value has not reached the suppression condition m/N=2, the suppression determination unit 124 determines not to suppress the low-priority interrupt process.

At time t2, the interrupt reception unit 111 receives the interrupt request output from ch0. The interrupt processing unit 114 performs the interrupt process of ch0. The suppression target determination unit 122 refers to the interrupt suppression target in the interrupt suppression table 105 and determines that ch0 in which the interrupt has occurred is not the suppression target. In that case, the counter 123 does not change the count value.

At time t3, the interrupt reception unit 111 receives the interrupt request output from ch15. The interrupt processing unit 114 performs the interrupt process of ch15. The suppression target determination unit 122 refers to the interrupt suppression target in the interrupt suppression table 105 and determines that ch15 in which the interrupt has occurred is the suppression target. In that case, the counter 123 increments the count value by one and updates the count value to "2". Since the count value has reached the suppression condition m/N=2, the suppression determination unit 124 determines to suppress the low-priority interrupt process. The suppression determination unit 124 outputs the suppression signal to each of the communication interfaces 103-6 and 103-13 to 103-15 of ch6 to ch15, and suppresses the occurrence of the upcoming low-priority interrupts.

At time t4, the interrupt reception unit 111 receives the interrupt request output from ch5. Since the communication interface 103-5 of ch5 is of high priority, no suppression signal is output to ch5, and the interrupt control unit 133 of the communication interface 103-5 can output the interrupt request to the CPU core 101. The interrupt processing unit 114 performs the interrupt process of ch5. The suppression target determination unit 122 refers to the interrupt suppression target in the interrupt suppression table 105 and determines that ch5 in which the interrupt has occurred is not the suppression target. In that case, the counter 123 does not change the count value.

At time t5, the number of messages stored in the buffer 131 reaches a predetermined number in the communication interface 103-14, that is, the communication interface of ch14. However, since the suppression signal is output from the suppression determination unit 124 of the CPU core 101, the interrupt control unit 133 of the communication interface 103-14 does not output the interrupt request at this timing. In the CPU core 101, the main processing unit 113 resumes the main process after the interrupt process of ch5 is ended.

At time t6, the number of messages stored in the buffer 131 reaches a predetermined number in the communication interface 103-13, that is, the communication interface of ch13. However, since the suppression signal is output from the suppression determination unit 124 of the CPU core 101, the interrupt control unit 133 of the communication interface 103-13 does not output the interrupt request at this timing.

At time t7, the timer unit 104 generates the timer interrupt, and the next cycle time is started. The main processing unit 113 starts the main process when the timer unit 104 causes the timer interrupt to occur. In addition, the initialization unit 121 initializes the count value of the counter 123 to 0, and initializes the suppression state of the interrupt suppression table 105 to "RELEASED". The suppression determination unit 124 stops the output of the suppression signal. Since the suppression signal that has been output from the suppression determination unit 124 is stopped, the interrupt control unit 133 of the communication interfaces 103-13 and 103-14 can output the interrupt request to the interrupt controller 102.

At time t8, the interrupt reception unit 111 of the CPU core 101 receives the interrupt request output from the communication interface of ch14. The interrupt processing unit 114 performs the interrupt process of ch14. The suppression target determination unit 122 determines that the communication interface of ch14 is the suppression target. In that case, the counter 123 updates the count value to "1". Since the suppression condition is m/N=2, the suppression determination unit 124 determines not to suppress the low-priority interrupt process.

At time t9, the interrupt reception unit 111 of the CPU core 101 receives the interrupt request output from the communication interface of ch13. The interrupt processing unit 114 performs the interrupt process of ch13. The suppression target determination unit 122 determines that the communication interface of ch13 is the suppression target. The counter 123 updates the count value to "2". Since the count value has reached the suppression condition, the suppression determination unit 124 determines to suppress the low-priority interrupt process. The suppression determination unit 124 outputs the suppression signal to the communication interfaces of ch6 and ch13 to ch15, and suppresses the occurrence of the upcoming low-priority interrupts.

Note that the low-priority interrupt process is delayed by N cycle times in a case where the waiting time is the longest due to the suppression signal. In this case, the buffer 131 of the communication interface 103 further needs N cycle times until the delayed interrupt process is processed. Therefore, it is sufficient that the size of the buffer 131 is expanded to a size that enables a message to be stored for the amount that is twice the N cycle times so that a new message generated within the time can be stored. As described above, by making the size of the buffer 131 twice the N cycle times, the situation in which the message transmitted from the external device overflows from the buffer 131 while the interrupt process is delayed can be avoided. In addition, the buffer control unit 132 may output the interrupt request to the interrupt control unit 133 when the message is stored up to half of the capacity of the buffer 131. With this configuration, the influence of the delay of the interrupt process can be suppressed.

In the present embodiment, by dividing the total number of interrupts of other than high priority by the cycle N of the interrupts of other than high priority, the upper limit of the number of interrupt processes of other than high priority that is to be processed in one cycle time is set. With this configuration, the CPU core 101 can process the interrupts of other than high priority generated in the time of the cycle N in a distributed manner. By doing so, in each cycle time, the main processing time can be determined on the basis of the distributed interrupt processing time. Therefore, the main processing time can be secured as compared with a case where the interrupt suppression control is not performed. That is, the CPU core 101 can execute the main process with more time as compared with a case where the interrupt suppression control is not performed.

Second Embodiment

Figure 8:
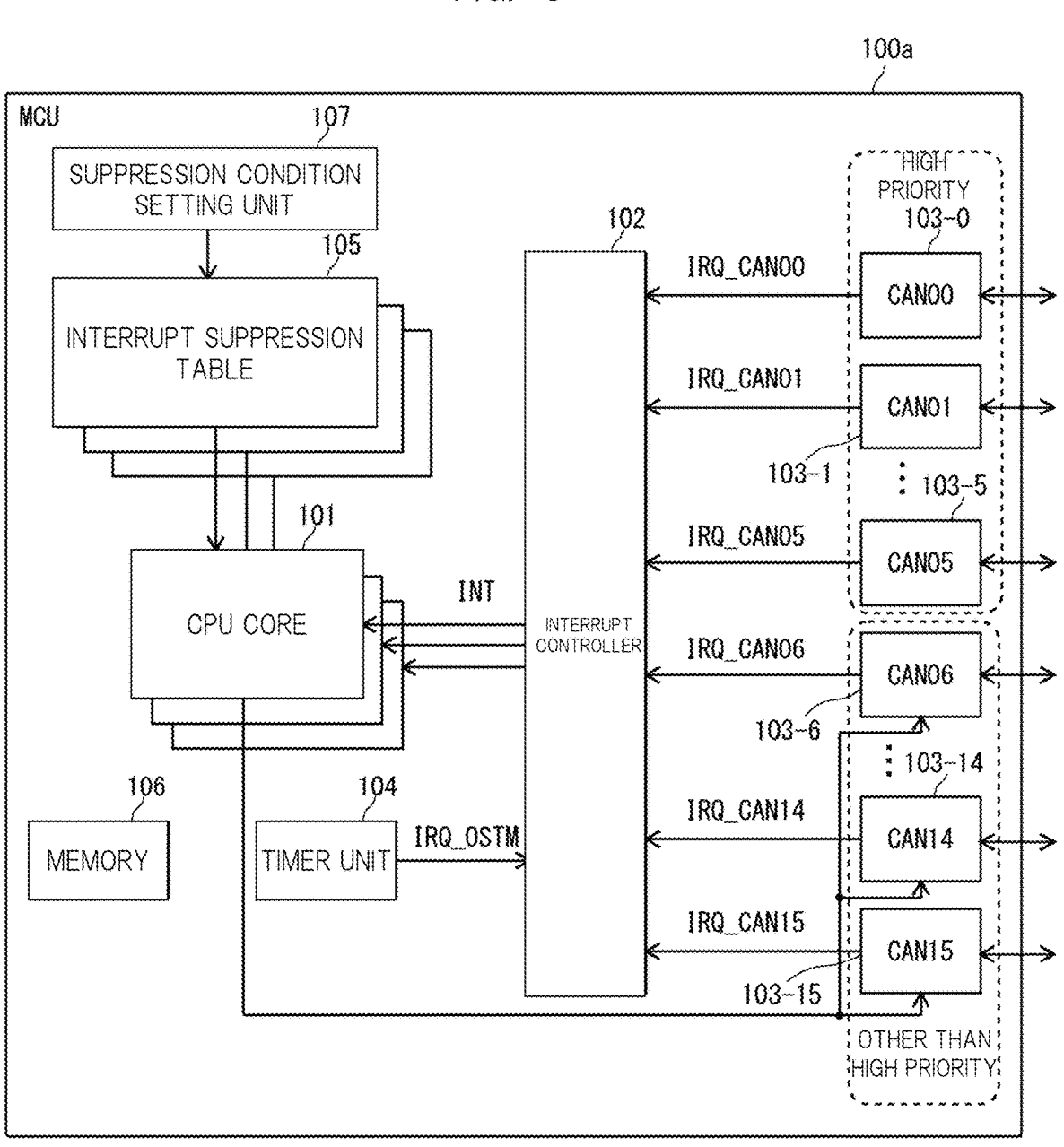
FIG. 8 is a block diagram illustrating a configuration example of a semiconductor device according to a second embodiment of this disclosure.

FIG. 8 illustrates a configuration example of a semiconductor device according to a second embodiment of this disclosure. In the present embodiment, an MCU 100*a* includes a suppression condition setting 107 in addition to the configuration of the MCU 100 illustrated in FIG. 1. The suppression condition setting unit 107 generates a suppression condition that is a condition for suppressing the low-priority interrupt process and registers the suppression condition in an interrupt suppression table 105.

For example, a user stores, in a not-illustrated register of the MCU 100*a*, a value of a natural number m indicating the number of interrupts of other than high priority, that is, the number of suppression target interrupts. In addition, the user stores, in the register, a value of a natural number N indicating a value indicating an occurrence cycle of the interrupt process of other than high priority. In other words, the user stores, in the register, a value N indicating how many cycle times of the interrupt process of other than high priority are required to complete the process. The suppression condition setting unit 107 reads the value of m and the value of N from the register. The suppression condition setting unit 107 calculates m/N and registers a value obtained by rounding up a decimal of the calculated value in the interrupt suppression table 105 as a suppression condition.

In the present embodiment, the suppression condition setting unit 107 registers the value of the suppression condition in the interrupt suppression table 105 according to the value given by the user. By using the suppression condition setting unit 107, the user can easily register the value of the suppression condition in the interrupt suppression table. Other effects are the same as those of the first embodiment.

Third Embodiment

A third embodiment will be described. In the first embodiment and the second embodiment, an example has been described in which all the interrupt processes of other than high priority are required to end within the same N cycle times. However, the cycle required for the interrupt process of other than high priority is not limited to one cycle, and there may be a case where a certain interrupt process is required to end the process within two cycles, whereas another interrupt process is required to end the process within four cycles. In the present embodiment, an interrupt suppression control unit 112 controls the suppression of the interrupt process of other than high priority, for the interrupt process of a plurality of priorities having a plurality of requested cycles different from each other.

In the present embodiment, the interrupt process of other than high priority includes two interrupt processes having different priorities. The interrupt processes of other than high priority includes an interrupt process of a priority of a medium degree and an interrupt process of a low priority. The interrupt process of a priority of a medium degree (second priority) is also called a medium-priority interrupt process. The interrupt process of a low priority (third priority) is also called a low-priority interrupt process. In the present embodiment, an interrupt suppression table 105 stores, for each of the medium-priority interrupt process and the low-priority interrupt process, a communication interface of an interrupt suppression target, the number of suppression target interrupts, a requested cycle, a suppression condition, and a suppression state.

FIG. 9 illustrates an example of the interrupt suppression table 105 used in the third embodiment. In this example, the interrupt suppression table 105 stores, for the medium-priority interrupt process, information indicating that the communication interface of the interrupt suppression target is ch06 to ch09. In this case, a number m1 of suppression target interrupts is m1=4. In addition, the interrupt suppression table 105 stores a requested cycle N1=2 for the medium-priority interrupt process.

In this case, the suppression condition (first suppression condition) of the interrupt process of a medium degree is m1/N1=2.

In addition, the interrupt suppression table 105 stores, for the low-priority interrupt process, information indicating that the communication interface of the interrupt suppression target is ch10 to ch15. In this case, the number m2 of suppression target interrupts is m2=6. The interrupt suppression table 105 stores a requested cycle N2=3 for the low-priority interrupt process. In this case, the suppression condition (second suppression condition) of the interrupt process of a low degree is m2/N2=2.

In the present embodiment, a suppression target determination unit 122 of an interrupt suppression control unit 112 determines whether or not the interrupt received by an interrupt reception unit 111 is a target of the medium-priority interrupt suppression control and whether or not the interrupt received by the interrupt reception unit 111 is a target of the low-priority interrupt suppression control. In a case where the communication interface of the occurrence source of the received interrupt is registered as the medium-priority interrupt suppression target, the suppression target determination unit 122 determines that the received interrupt is the target of the medium-priority interrupt suppression control. In a case where the communication interface of the occurrence source of the received interrupt is registered as the low-priority interrupt suppression target, the suppression target determination unit 122 determines that the received interrupt is the target of the low-priority interrupt suppression control.

In the present embodiment, a counter 123 counts, for each of the low priority and the medium priority, the number of times the interrupt processes have occurred. If the suppression target determination unit 122 determines that the interrupt is the target of the medium-priority interrupt suppression control, the counter 123 increments a medium-priority count value by 1. If the suppression target determination unit 122 determines that the interrupt is the target of the low-priority interrupt suppression control, the counter 123 increments a low-priority count value by 1.

A suppression determination unit 124 determines whether or not to suppress the medium-priority interrupt process on the basis of the medium-priority count value of the counter 123 and the medium-priority suppression condition of the interrupt suppression table 105. A suppression determination unit 124 determines whether or not to suppress the low-priority interrupt process on the basis of the low-priority count value of the counter 123 and the low-priority suppression condition of the interrupt suppression table 105.

If it is determined that the medium-priority interrupt process is to be suppressed, the suppression determination unit 124 outputs a suppression signal to the communication interface registered as the medium-priority interrupt suppression target in the interrupt suppression table 105. If it is determined that the low-priority interrupt process is to be suppressed, the suppression determination unit 124 outputs a suppression signal to the communication interface registered as the low-priority interrupt suppression target in the interrupt suppression table 105. Upon receiving the suppression signal, a communication interface 103 suppresses the output of the interrupt request.

In the example in FIG. 9, a CPU core 101 performs $m1/N1=2$ interrupt processes in each cycle time for the medium priority. For the low priority, the CPU core 101 performs $m2/N2=2$ interrupt processes in each cycle time. In this case, for the medium priority, the CPU core 101 can perform m1 pieces of the medium-priority interrupt processes in a distributed manner during the N1 cycle time. Furthermore, for the low priority, the CPU core 101 can perform m2 pieces of the low-priority interrupt processes in a distributed manner during the N2 cycle time. In this case, in each cycle time, the time that can be used for the main process by the CPU core 101 is expressed as the following.

$$\text{Main processing time} < \text{Cycle time} - \{\text{Processing time of all high-priority interrupts} + (\text{Processing time of all medium-priority interrupts}/N1) + (\text{Processing time of all medium-priority interrupts}/N2)\}.$$

In the present embodiment, the interrupt suppression control is performed for each of the interrupt processes of other than high priority of the two priorities having different requested cycles. If the interrupt suppression control is performed without having the low priority and the medium priority distinguished from each other, the suppression condition is determined by using the requested cycle of the medium-priority interrupt process in which the request is severe as the interrupt suppression condition. In this case, the time that can be used for the main process by the CPU core 101 is expressed as the following.

$$\text{Main processing time} <$$
$$\text{Cycle time} - \{\text{Processing time of all high-priority interrupts} +$$
$$(\text{Processing time of all medium-priority interrupts} +$$
$$\text{Processing time of all medium-priority interrupts})/N1\}.$$

In the present embodiment, by performing the interrupt suppression control on each of the interrupts of low priority and medium priority, the time that can be used for the main process in each cycle time can be extended as compared with a case where the interrupts of low priority and medium priority are not distinguished from each other.

Although the invention made by the present inventors has been specifically described above on the basis of the embodiments, the present invention is not limited to the embodiments described above, and it goes without saying that various modifications can be made without departing from the gist of the present invention.

What is claimed is:

1. A semiconductor device circuit comprising:
a main processing unit that is configured to start up a main process every start of a cycle time;
a plurality of communication interfaces that is coupled to a communication bus and is configured to output an interrupt request;
an interrupt reception unit that is configured to receive the interrupt request;
an interrupt processing unit that is configured to perform an interrupt process including an interrupt process of a first priority and an interrupt process of a second priority having a lower priority than the first priority, the interrupt processing unit being configured to perform, in response to the interrupt request received by the interrupt reception unit, the interrupt process of the first priority or the interrupt process of the second priority; and
an interrupt suppression control unit that is configured to control a number of the interrupt processes of the second priority processed by the interrupt processing unit in the cycle time, according to a first suppression condition set on a basis of a cycle in which the interrupt process of the second priority occurs and a total number of the interrupt processes of the second priority occurring within a period corresponding to the cycle.

2. The semiconductor device circuit according to claim 1, wherein the first suppression condition defines an upper limit of a number of times of the interrupt process of the second priority performed by the interrupt processing unit in the cycle time, and
wherein the interrupt suppression control unit is configured to perform control of the interrupt suppression by using an interrupt suppression table including the suppression condition.

3. The semiconductor device circuit according to claim 2, wherein the interrupt suppression table includes an interrupt suppression target that defines a communication interface corresponding to the interrupt process of the second priority among the plurality of communication interfaces, and
wherein the interrupt suppression control unit includes:
a suppression target determination unit that is configured to determine whether or not an interrupt request received by the interrupt reception unit is an interrupt request output from the communication interface registered as the interrupt suppression target;
a counter that is configured to count a number that the received interrupt request is determined as an interrupt request output from the communication interface registered as the interrupt suppression target; and
a suppression determination unit that is configured to determine whether or not to suppress the interrupt request output from the communication interface registered as the interrupt suppression target, on a basis of a count value of the counter and the upper limit of the number of times defined by the first suppression condition.

4. The semiconductor device circuit according to claim 3, wherein the suppression determination unit is configured to determine to suppress the interrupt request output from a communication interface registered as the interrupt suppression target in a case where a count value of the counter reaches the upper limit of the number of times defined by the first suppression condition.

5. The semiconductor device circuit according to claim 3, wherein the suppression determination unit is configured to suppress the interrupt request output from a communication interface registered as the interrupt suppression target by outputting a suppression signal configured to suppress output of the interrupt request to the communication interface registered as the interrupt suppression target.

6. The semiconductor device circuit according to claim 5, wherein the suppression determination unit is configured to release the output of the suppression signal every time the cycle time starts.

7. The semiconductor device circuit according to claim 3, wherein the interrupt suppression control unit further includes an initialization unit that is configured to initialize the counter every time the cycle time starts.

8. The semiconductor device circuit according to claim 1, wherein the interrupt process of the second priority occurs at a cycle indicated by N times the cycle time, where N is a natural number.

9. The semiconductor device circuit according to claim 8, wherein the interrupt suppression control unit is configured to use m as a natural number indicating a total number of the interrupt processes of the second priority occurring in a period corresponding to the cycle to control a number of the interrupt processes of the second priority processed by the interrupt processing unit within one of the cycle times to be equal to or less than an integer obtained by rounding up a decimal of a value of m/N.

10. The semiconductor device circuit according to claim 1, further comprising a suppression condition setting unit that is configured to use, as inputs, a value of a natural number N indicating a cycle in which the interrupt process of the second priority occurs and a value of a natural number m indicating a total number of the interrupt processes of the second priority occurring in a period corresponding to the cycle to calculate an integer obtained by rounding up a decimal of a value of m/N, and to set the calculated integer as the first suppression condition.

11. The semiconductor device circuit according to claim 1,
    wherein the interrupt process includes an interrupt process of a third priority having a priority lower than the second priority,
    wherein the interrupt processing unit is configured to perform the interrupt process of the first priority, the interrupt process of the second priority, or the interrupt process of the third priority in response to an interrupt request received by the interrupt reception unit, and
    wherein the interrupt suppression control unit is configured to further control a number of the interrupt processes of the third priority to be processed by the interrupt processing unit in the cycle time according to a second suppression condition set on a basis of a cycle in which the interrupt process of the third priority occurs and a total number of the interrupt processes of the third priority occurring within a period corresponding to the cycle.

12. The semiconductor device circuit according to claim 11,
    wherein the interrupt process of the second priority occurs at a cycle indicated by N1 times the cycle time, where N1 is a natural number, and the interrupt process of the third priority occurs at a cycle indicated by N2 times the cycle time, where N2 is a natural number, and
    wherein the interrupt suppression control unit is configured to use m1 as a natural number indicating a total number of the interrupt processes of the second priority occurring in a period of N1 times the cycle time to control a number of the interrupt processes of the second priority processed by the interrupt processing unit within one of the cycle times to be equal to or less than an integer obtained by rounding up a decimal of a value of m1/N1, and to use m2 as a natural number indicating a total number of the interrupt processes of the third priority occurring in a period of N2 times the cycle time to control a number of the interrupt processes of the third priority processed by the interrupt processing unit within one of the cycle times to be equal to or less than an integer obtained by rounding up a decimal of a value of m2/N2.

\* \* \* \* \*